Patented Sept. 20, 1949

2,482,293

UNITED STATES PATENT OFFICE 2,482,293

VULCANIZED POLYMERS OF CHLOROPRENE

Paul A. Sanders, Wilmington, Del., assignor to E. I. du Pont de Nemours & Company, Wilmington, Del., a corporation of Delaware No Drawing. Application May 6, 1947,
Serial No. 746,315

3 Claims. (Cl. 260—41.5)

1

This invention relates to the production of polymers of chloroprene, and more particularly to the preparation of polymers of chloroprene which are resistant to the undesirable effects produced by heat and light on the ordinary polychloroprene stocks.

Prolonged exposure to elevated temperatures, such as 140°–150° C., often results in severe deterioration of polychloroprene stocks. This deterioration is characterized by discoloration, changes in stress-strain properties, embrittlement and evolution of HCl. Where the polychloroprene is in contact with textile materials, and more particularly cellulosic materials such as rayon, etc., the liberation of HCl due to exposure to heat and light may cause severe tendering of the fabric or other cellulosic material in contact therewith, with subsequent loss in strength of the cellulosic material. The polychloroprene may also discolor due to exposure to heat and light, making it unsuitable for use in the preparation of white or light-colored stocks which are often used in the manufacture of articles such as bathing caps, white side-wall tires, etc., and its use has therefore been limited by this photo-sensitivity.

It is therefore an object of this invention to provide chloroprene polymers which are resistant to the effects of heat and light to the extent that deterioration of the stocks with respect to stress-strain properties, embrittlement, evolution of HCl and discoloration are materially reduced, thereby giving improved products and further permitting the use of polychloroprene in the production of white or light-colored vulcanized products such as tires, etc., particularly where heat is developed during use.

I have found that chloroprene polymers, which have been compounded with from 1 to 50 parts of zinc oxide (ZnO) and from 0.01 to 5 parts of an alkali metal salt of an aliphatic polyhydroxythiol containing 5 or 6 carbon atoms, do not exhibit deterioration upon exposure to heat and light which normally is experienced in the use of chloroprene polymers which do not contain the alkali metal salt of the aliphatic polyhydroxythiol, particularly where heat is developed during such use or where it is subjected to light or elevated temperatures during use.

The preferred polyhydroxythiols are 1-thiosorbitol and 1-thioxylitol, which are preferably used as the sodium salts although other alkali metal salts of the same may be used. The 1-thiosorbitol is particularly preferred for stabilizing the chloroprene polymers against deterioration by heat and light. It is also preferred that the polychloroprene compositions also contain the usual anti-oxidants normally employed in the production of vulcanized polychloroprene products.

The stabilized chloroprene polymer compositions may be prepared by incorporating the alkali metal salts of the polyhydroxythiols in any suitable manner, such as by adding the alkali metal salts of the polyhydroxythiols and the ZnO directly to the polychloroprene latex prior to coagulation of the latex or the use of such latex for the production of films by the usual procedures such as dipping, casting, etc. When working with alkaline polychloroprene latices, the polyhydroxythiol may be employed provided the latex contains a sufficient amount of alkali metal hydroxide to form the sodium salts of the polyhydroxythiol. Stabilized dry polymer compositions are produced by adding the ZnO and the alkali metal salts of the polyhydroxythiols directly to the polymer while being worked on the rubber mill or in any other mixer which may be used for compounding rubber. The amount of ZnO employed is not critical, and stabilization by the use of the polyhydroxythiol is obtained when 50 parts of ZnO are present per 100 parts of polymer, as well as when only 5 parts or even as little as 1 part of ZnO are employed.

The following examples are given to illustrate the invention. The parts, or per cent, employed in the examples are by weight.

Example 1

One hundred (100) parts by weight of an alkaline polychloroprene latex, made according to U. S. Patent 2,264,173, was compounded with 5 parts of a 50% aqueous dispersion of zinc oxide prepared by grinding ZnO in water containing a dinaphthylmethane sodium sulfonate and ammoniacal casein. To the compounded latex, 4 parts of a 25% aqueous solution of 1-thiosorbitol was added by a stirring. A plate film was then prepared by pouring the latex onto a limited area of a level glass plate and allowing evaporation to take place. The film was cured for two hours at 140° C. After aging for 48 hours at 140° C. in an air oven, the film was still soft and flexible and had lost no chlorine. A control film with no thiosorbitol present lost 36% of its chlorine and became brittle during the same time.

Example 2

A plate film was prepared from 100 parts by weight of the 50% latex used in Example 1, compounded with 5 parts of an aqueous 50% ZnO dispersion, 3 parts of an aqueous 33% phenyl-beta-naphthylamine dispersion and 4 parts of an aqueous 29% 1-thiosorbitol solution. After aging for 96 hours at 140° C. in an air oven, the film was still soft and flexible and had lost no chlorine. A control film containing no 1-thiosorbitol lost 41% of its chlorine during this time, and became extremely brittle.

EXAMPLE 3

One hundred (100) parts of the 50% latex used in Example 1 was compounded with 5 parts of an aqueous 50% dispersion of ZnO, 3 parts of an aqueous 33% dispersion of phenyl-beta-naphthylamine and 4 parts of an aqueous 25% solution of 1-thioxylitol. A plate film prepared from the above latex lost only 2% chlorine and remained soft and flexible after aging 48 hours at 150° C. in an air oven. A control film with no thioxylitol lost 42% chlorine and became brittle during 48 hours at 150° C.

EXAMPLE 4

Polychloroprene latex, compounded with ZnO, phenyl-beta-naphthylamine and the sodium salt of 1-thiosorbitol as in Example 2, was applied to a 3" x 9" strip of cordura rayon by dipping the fabric into the latex. After drying 4 hours at 70° C., a 3" x 3" portion of the fabric was aged for 96 hours at 140° C. in an air oven. During this time the fabric lost only 49% of its tensile strength. A control fabric, coated with latex compounded with ZnO and phenyl-beta-naphthylamine only, was completely degraded during the same aging period, and lost 100% of its tensile strength.

EXAMPLE 5

A coated rayon fabric was prepared as in Example 4, except that 1-thioxylitol was substituted for the 1-thiosorbitol. After aging 36 hours at 150° C. in an air oven, the fabric retained 53% of its original tensile strength. A control fabric, coated with latex containing no 1-thioxylitol, was completely degraded after aging 24 hours at 150° C.

EXAMPLE 6

One hundred (100) parts of the 50% polychloroprene latex used in Example 1 was compounded with 5 parts of an aqueous 50% dispersion of zinc oxide, 15 parts of an aqueous 33% dispersion of titanium dioxide pigment, 4 parts of an aqueous 25% dispersion of hydroquinone monobenzyl ether and 4 parts of an aqueous 25% solution of 1-thiosorbitol. A plate film was prepared from the latex and cured for 60 minutes at 140° C. in an air oven. The film was then exposed in a fadeometer for 24 hours. After exposure, the film had a light reflectance of 86% compared to the original.

A control film, prepared similarly except for the absence of 1-thiosorbitol, had a light reflectance only 50% of the original after 24 hours fadeometer exposure. The light reflectance of an exposed sample compared to that of the original sample, indicates the extent of discoloration.

EXAMPLE 7

One hundred (100) parts of plastic polychloroprene, made according to U. S. Patent 2,234,215, was compounded on a mill with 5 parts of zinc oxide and 2 parts of the sodium salt of 1-thiosorbitol, which was added as an aqueous solution, the water being allowed to evaporate on the mill. 3" x 6" slabs of the resulting stock were prepared and cured at 40 minutes at 60 pounds steam pressure. A series of control slabs, compounded with 5 parts of ZnO only, were also prepared and cured. The slabs were then aged for varying lengths of time at 150° C. in an air oven, and their stress-strain properties were determined. As shown by the results in the table, the stock stabilized with the sodium salt of 1-thiosorbitol was far more heat resistant than the unstabilized control.

Table

| Aging Period, Hrs./150° C. | Per Cent Retention of Tensile Strength | | Per Cent Retention of Elongation | |
|---|---|---|---|---|
| | Unstab. | Stab. | Unstab. | Stab. |
| 2 | 14 | 75 | 53 | 90 |
| 4 | 11 | 49 | 30 | 82 |
| 8 | 7 | 23 | 21 | 59 |

The present invention may be applied to any rubber-like polymers of chloroprene, including those containing other polymerizable compounds interpolymerized therewith. The invention is particularly concerned with the production of polymers of chloroprene in which 50% or more of the monomeric material employed in the production of the polymer is chloroprene. It will be obvious, however, that, where the undesirable deterioration of the polychloroprene takes place upon exposure to heat and light, it is also desirable to stabilize such material even when the polymer contains less than 50% of chloroprene.

The salt of the polyhydroxythiol may be added as a solid to the solid polychloroprene on a rubber mill, or in any other mixing device used for compounding rubber. It may also be added thereto as an aqueous solution as in Example 7, and the water allowed to evaporate. When added to polychloroprene latex, the agent is preferably added as an aqueous solution. As in some of the above examples, a solution of the free thiol may be used if the latex is alkaline enough to neutralize it. In any case, the thiol should be present in the form of a salt at the time the latex is used.

In addition to the ZnO and, preferably, antioxidant which are used along with the thiol, other materials such as pigments, fillers, vulcanization aids and the like, may also be added. Where discoloration on exposure to light is to be avoided, it is obvious that those particular anti-oxidants which tend to discolor, such as phenyl-beta-naphthylamine, should not be used. The vulcanization (curing) of the compounded polychloroprene is carried out by the known methods, such as by heating, as described, for example, in U. S. Patent 1,950,436.

While in certain of the examples the tests employed are accelerated tests, they are the tests commonly used to determine the reactions which normally take place even at lower temperatures when the material is subjected to such lower temperatures for extended periods of time. In many uses, such as in tires where flexing of side walls occurs, the temperatures developed cause deterioration of polychloroprene stock which does not contain the salts of the aliphatic polyhydroxythiols of this invention.

The products of the present invention may be used wherever polychloroprene with good resistance to the action of heat and light is desired. As described above, the polychloroprene latex compounded with the polyhydroxythiol may be used, for example, to coat or impregnate various fibrous materials or to form sheets, threads and other structures, while the compounded solid polychloroprene may be used in the regular way for the manufacture of molded, extruded or coated articles, and the like.

I claim:

1. Chloroprene polymers having improved resistance to the deteriorating effects of heat and light, having incorporated therein, based on 100 parts of the polymer, from 1 to 50 parts of zinc oxide and from 0.01 to 5 parts of an alkali metal salt of an aliphatic polyhydroxythiol which contains at least 5 and not over 6 carbon atoms.

2. Chloroprene polymers having improved resistance to the deteriorating effects of heat and light, having incorporated therein, based on 100 parts of the polymer, from 1 to 50 parts of zinc oxide and from 0.01 to 5 parts of the sodium salt of 1-thiosorbitol.

3. Chloroprene polymers having improved resistance to the deteriorating effects of heat and light, having incorporated therein, based on 100 parts of the polymer, from 1 to 50 parts of zinc oxide and from 0.01 to 5 parts of the sodium salt of 1-thioxylitol.

PAUL A. SANDERS.

REFERENCES CITED

The following references are of record in the file of this patent:

UNITED STATES PATENTS

| Number | Name | Date |
|---|---|---|
| 2,337,424 | Stoner, Jr., et al. | Dec. 21, 1943 |
| 2,432,296 | Dorough | Dec. 9, 1947 |